Figure 6:
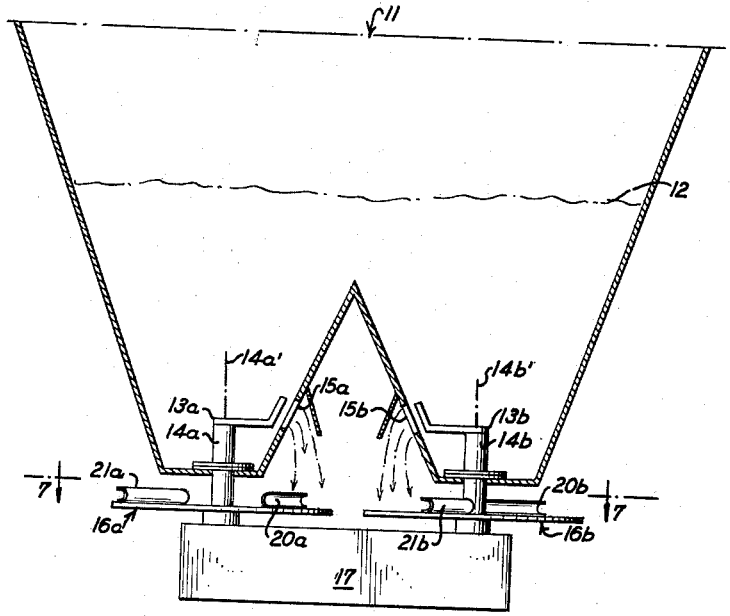

Nov. 5, 1963
H. DREYER
3,109,657
CENTRIFUGAL SPREADER
Filed Feb. 16, 1962
2 Sheets-Sheet 1
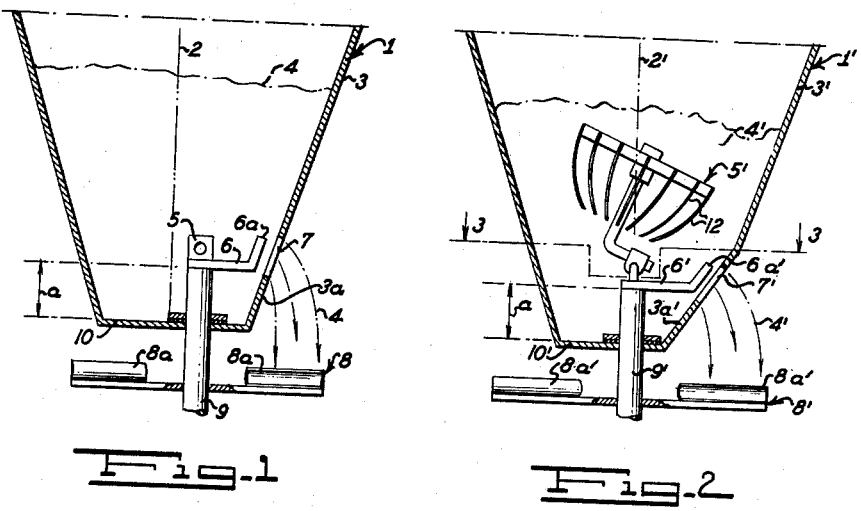
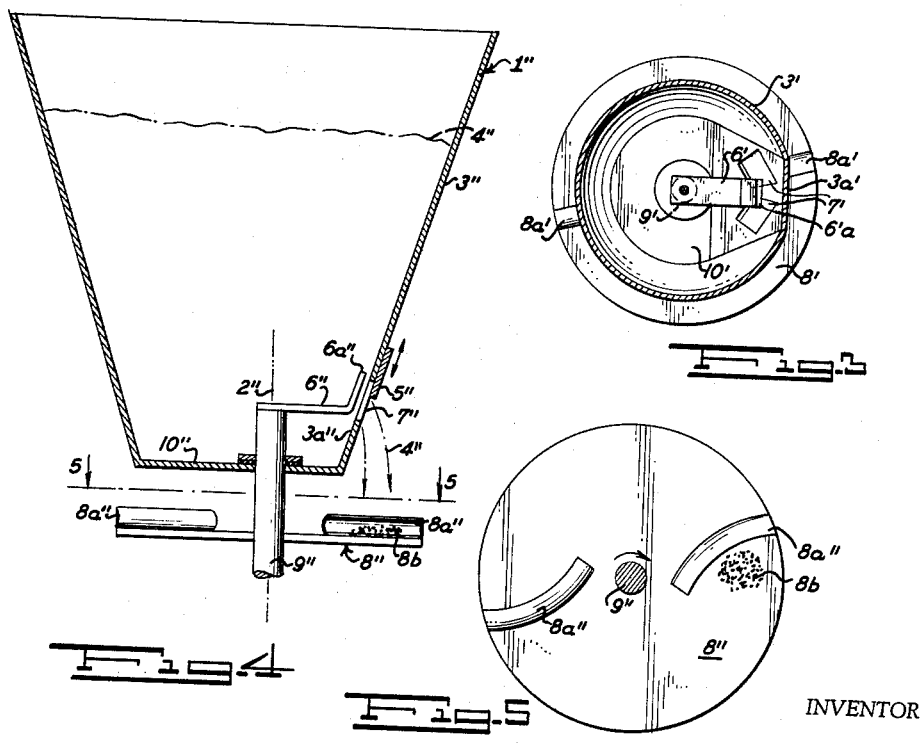
INVENTOR
HEINZ DREYER
BY
Burgess, Dinklage & Sprung
ATTORNEYS Nov. 5, 1963

H. DREYER 3,109,657

CENTRIFUGAL SPREADER

Filed Feb. 16, 1962

2 Sheets-Sheet 2

INVENTOR

HEINZ DREYER

BY Burgess Dinklage Sprung
ATTORNEYS

United States Patent Office 3,109,657
Patented Nov. 5, 1963

3,109,657
CENTRIFUGAL SPREADER
Heinz Dreyer, Osnabruck, Germany, assignor to Amazonen-Werke H. Dreyer, Osnabruck, Germany, a German corporation
Filed Feb. 16, 1962, Ser. No. 174,661
Claims priority, application Germany Sept. 21, 1961
19 Claims. (Cl. 275—8)

The present invention relates to a centrifugal spreader for particle fertilizer material, and more particularly to such a spreader having a tubular storage bin containing a thrust finger rotatably passing more closely to a portion of the side wall of the storage bin containing an ejection opening than to the remainder of the side wall of the bin, and also having a rotatable scoop disc situated below the ejection opening for centrifugally spreading therefrom particle fertilizer material received thereon from the ejection opening.

Many problems beset the spreading of granular fertilizer materials onto the ground by mechanical means in view of the fact that, as a general rule, fertilizer materials are hygroscopic in nature and tend to cake and fuse into larger masses unsuitable for precise, thorough, and complete spreading over the ground to be treated therewith.

In the past, tubular storage bins have been used for spreading fertilizer materials, a rotatable ejection member being disposed within the bin for forcing the material through an opening and in turn onto the ground. Due to the fact that the fertilizer grains adhere to one another to form solid cakes when stored over short periods of time within such storage bins, especially along the closed bottom of the bin which is impermeable to moisture and to the flow of grains therethrough, such centrifugal spreaders have been modified by providing an elastic or flexible material as the bottom wall of the bin or by providing an elastic or flexible insert for the bottom portion of the bin. However, while the rotatable ejection means within the bin will force the material outwardly therefrom through one or more ejection openings in the side wall of the bin, the particular arrangement contemplating the use of elastic or flexible bottom portions disadvantageously requires an additional expenditure than is the case with respect to conventional storage bin constructions. Moreover, there is always the danger that the elastic or flexible bottom portion of the container or insert therefor will tend to vibrate or oscillate by reason of the suction and pressure forces which are generated during the rotation of the ejection member within the storage bin in order to force the material through the openings, such vibrations causing the elastic or flexible bottom portion or insert to be placed into the path of movement of the ejection member, whereby the same are destroyed by the rotating member.

Furthermore, a uniform distribution of the fertilizer material onto the ground has been sought by twisting or turning the storage bin and concomitantly the ejection openings in the horizontal or perpendicular direction, whereby the fertilizer ejected from the openings will be displaced within the limits of the turning or twisting. Thus, the fertilizer material will be dispersed over the area of the rotating discs used to centrifugally spread the fertilizer onto the ground after it has left the ejection openings. While this turning and twisting action displaces the material within the bin, it also serves to distribute the material ejected from the openings onto the rotating spreading discs at various points rather than at just one zone. Scoop members are provided usually on the rotating discs for catching the ejected fertilizer material and hurling the same centrifugally outwardly onto the ground therebelow. Straight edge scoop members have been used in this connection and by adjustment of the angle of the straight edge on the disc various corresponding adjustments in the manner of centrifugally spreading the material are achieved. In addition to the straight edge scoop members, horizontally positioned rotating discs are also known which carry curved scoop members having their concave side directed toward the rotating direction of the disc in order to attain as broad a dispersion zone as possible and in turn increased hurling distances of the particle fertilizer material centrifugally outwardly of the discs.

Nevertheless, these constructions suffer from the disadvantage that adjustments effected for the maintaining of a favorable spreading of the fertilizer material, in view of the properties and condition of the fertilizer, reflect the need for auxiliary adjustment devices requiring an increase in the cost of construction of the spreading machine used. Without such additional or auxiliary devices, the various adjustments occasioned by changes in the condition of the fertilizer material cannot be accommodated by the conventional type of spreading equipment. In this connection, it will be appreciated that a further disadvantage in the practical application of conventional equipment is that the operator must carry out a turning or twisting of the storage bin or an adjustment of the disc scoop members in the field, a chore to which farm hands may not be readily adaptable. Specifically, there are various adjustments which will be required, as for example where one type of fertilizer is replaced by another, such that allowances will have to be made for differences in moisture content, specific particle weight and/or size, adjustments in the quantity to be distributed by adjusting the size of the ejection openings, etc. Thus, the farm hands cannot be expected to execute the proper adjustments since they may not initially appreciate the nature or condition of the particular fertilizer being spread, the precise positioning of the scoop members on the rotating disc with respect to the ejection openings of the bins, or the effect of a change in the zone of the disc where the material is received from the ejection opening and/or of a change in the position of the scoop members with respect to such a zone change. In any case, extended trial and error methods would be required to achieve the necessary correction and adjustment of the spreader device which would be time consuming, especially since with each change in the type of fertilizer or adjustment in the size of the ejection opening or scoop member position, various factors will come into play, all of which must be correlated to obtain the desired spreading effect.

It is an object of the present invention to overcome the foregoing drawbacks and to provide a centrifugal spreader for particle fertilizer material which avoids the caking or sticking together of the fertilizer particles in the storage bin and which permits the material to be ejected onto the rotating disc in such a manner that the scoop members will accommodate this material and centrifugally hurl the same outwardly from the disc to achieve an optimum spreading operation.

Figure 7:
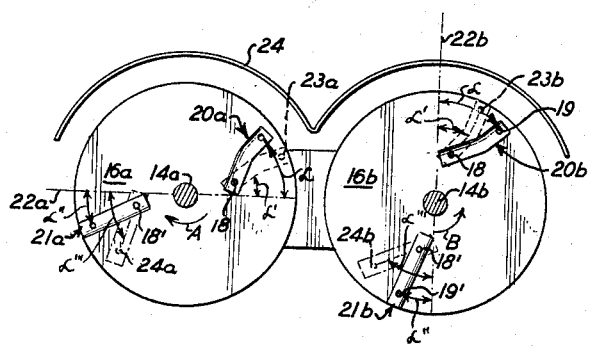

Other and further objects of the invention will become apparent from a study of the within specification and accompanying drawings in which, FIG. 1 is a schematic partial view of a tubular storage bin in accordance with the invention with certain portions being shown in section, FIG. 2 is a schematic partial view of an alternate embodiment in accordance with the invention with certain portions shown in section, FIG. 3 is a schematic sectional view taken along the line 3—3 of FIG. 2, FIG. 4 is a schematic view partially in section of a further embodiment of the invention, FIG. 5 is a schematic sectional view taken along the line 5—5 of FIG. 4, FIG. 6 is a schematic view partially in section of a modified embodiment of the invention showing a pair of centrifugal spreader devices in coacting arrangement, and FIG. 7 is a schematic sectional view taken along the lines 7—7 of FIG. 6.

It has been found in accordance with the present invention that an improved centrifugal spreader for particle fertilizer material may be provided which is efficient in operation and economical in construction. Briefly, the spreader comprises a tubular storage bin having a tubular side wall and an end wall, an opening defined in a portion of the side wall at a level spaced from the end wall, and an ejector bar mounted for rotation within the bin along a path spaced from the end wall and having a free end carrying a thrust finger which extends past the opening during each revolution for ejecting fertilizer from the bin through the opening. The closest point in the peripheral path of the thrust finger to the side wall during rotation of the ejector bar is adjacent the portion of the side wall having the opening defined therein. A rotatable scoop disc is situated below the opening for receiving thereon the fertilizer material ejected by the thrust finger through the opening and for centrifugally spreading such material during rotation of the disc and the scoop members thereon.

Preferably, the ejector bar carries a centrally disposed stirrer means rotatable therewith for conducting fertilizer material downwardly to the level of the bin at which the opening is located. Moreover, the ejector bar may be mounted for rotation on a shaft either eccentrically positioned with respect to the longitudinal axis of the bin, or the portion of the side wall in which the opening is defined may be provided closer to the axis of rotation of the ejector bar and the longitudinal axis of the tubular bin than the remaining portion of the side wall. Of course, the size of the opening may be adjustable and more than one opening may be provided in the said portion of the side wall. In accordance with a particular embodiment of the invention, the spreader comprises an inverted frusto-conical storage bin having a side wall and a bottom wall, an opening defined in the side wall at a level spaced from the bottom wall, a rotatable shaft having an end extending upwardly through the bottom wall into the bin and eccentrically positioned with respect to the central axis of the bin, an ejector bar secured to the end of the shaft for rotation therewith and extending radially outwardly therefrom at said level spaced from the bottom wall, the bar having a free end carrying a thrust finger which extends past the opening during each revolution of the shaft for ejecting fertilizer material from the bin through the opening such that the closest point in the peripheral path of the thrust finger to the side wall during rotation of the ejector bar is adjacent the opening. Conveniently, a rotatable scoop disc is situated on the other end of the shaft exterior to the bin below the opening for receiving thereon the fertilizer material ejected by the thrust finger through the opening and for centrifugally spreading the material during rotation of the disc and the scoop members thereon. Preferably, the bottom wall of the bin is impervious to moisture and to flow of particle fertilizer material therethrough.

In accordance with an alternate embodiment of the invention, the inverted frusto-conical storage bin side wall is provided with a flat portion defined by a plane intersecting the side wall and extending downwardly to the bottom wall at an angle with the vertical axis of the bin slightly larger than the normal angle of the side wall with the vertical axis. In this instance, the opening is defined in the flat portion at a level spaced from the bottom wall, the rotatable shaft having an end extending upwardly through the bottom wall into the bin being disposed along the vertical axis of the bin rather than eccentrically positioned with respect thereto. Stated another way, the portion of the side wall at the level at which the opening is defined therein is situated in a chord of a circle defined by the circular side wall at said level such that the radial distance of a line normal to the chord and extending from the chord to the shaft axis is substantially the same as the length of the ejector bar between the axis and the radially outermost portion of the thrust finger, whereby the thrust finger during rotation just clears the wall portion having the opening. Of course, a rotatable scoop disc is situated on the other end of the shaft exterior to the bin below the opening for receiving thereon the fertilizer material ejected by the thrust finger through the opening and for centrifugally spreading such material during rotation of the disc and scoop members.

With respect to the rotatable scoop disc, the same is conveniently provided with a top surface carrying scoop members thereon which are rotatable therewith. At least one of the scoop members is curved and is positioned on the disc surface extending from a point spaced from the center of the disc to the periphery of the disc such that the curved scoop member is placed substantially at a trailing angle to the radius of the disc passing through said point, with respect to the direction of rotation of the disc. The concave side of the curved scoop member is suitably directed toward the direction of rotation of the disc in order to effectively hurl the fertilizer material centrifugally outwardly in a precise manner.

In accordance with a further embodiment of the invention, two scoop members are provided on the disc top surface diametrically opposed to one another. While one of the scoop members may be curved, the other may be a straight edge scoop member, each member extending from a point on the disc surface spaced from the center of the disc to the periphery of the disc. Also, each scoop member is arranged on the disc substantially at a trailing angle to the radius of the disc passing through the corresponding point spaced from the center of the disc, with respect to the direction of rotation of the disc. Advantageously, one or both of the scoop members may be pivoted upon the disc at the point spaced from the center of the disc for adjustment of the trailing angle.

With respect to the curved scoop disc, the trailing edge may be defined between a chord joining the ends of the curved scoop member and passing through said point and the disc radius passing through said point. Preferably, each scoop member is provided with a U-shaped cross section, one free end of the U being secured to the disc surface while both free ends are directed toward the direction of rotation of the disc.

In accordance with a further embodiment of the invention, two adjacent tubular storage bins are provided having their side wall openings directed toward each other and their rotatable discs in the same horizontal plane and coupled for rotation at the same rate but in opposite directions. The diametrically opposed scoop members on one disc are staggered with respect to the diametrically opposed scoop members on the other disc for maximum efficiency in distributing the fertilizer on the ground below. Advantageously, a shield is provided adjacent about one half of the periphery of each disc on the same side of a line connecting the centers of the discs so that the fertilizer material will be spread in the desired direction.

Referring to the drawing, FIG. 1 shows an embodiment of the invention in which an inverted frusto-conical storage bin 1 is provided having a central vertical axis 2. Storage bin 1 includes a downwardly converging tubular side wall 3 and a horizontal bottom wall 10 which is impervious to moisture and to the flow of particle fertilizer material 4 downwardly therethrough. Shaft 9 is eccentrically positioned with respect to the bin axis 2 and upwardly extends through bottom wall 10 into the storage bin. Shaft 9 is mounted for rotation by means not shown and the end of the shaft extending through bottom wall 10 is sealed against the counterflow of fertilizer material downwardly through bottom wall 10 at that point. The upper end of shaft 9 within bin 1 carries a radially extending ejector bar 6 having a thrust finger 6a located at its outer end. Ejector bar 6 is situated on shaft 9 for rotation therewith along a path spaced from bottom wall 10 a distance a. A portion 3a of side wall 3 is provided with an opening 7 at substantially the level a so that due to the eccentric positioning of shaft 9 within bin 1, thrust finger 6a during rotation of shaft 9 will come closest to opening 7 in wall portion 3a whereby to eject fertilizer material 4 from the opening. The closest point in the peripheral path of thrust finger 6a with respect to the side wall 3 during rotation of ejector bar 6 will therefore always be adjacent the portion 3a of side wall 3 having opening 7 defined therein. An extension pin 5 is mounted on shaft 9 above ejector bar 6 for accommodating a stirrer element which may be attached to shaft 9 thereat for rotation therewith in order to guide fertilizer material 4 situated thereabove downwardly toward opening 7 in the desired manner. Rotatable scoop disc 8 is mounted on shaft 9 at a point below wall 10 so that material 4 ejected through opening 7 may be received thereon. Disc 8 is provided with scoop members 8a which extend from a point spaced from the center of disc 8 radially outwardly to the periphery of the disc so that these scoops may catch material 4 and centrifugally hurl the same outwardly so as to effectively distribute the material on the ground in a precise manner.

FIG. 2 illustrates a modified embodiment of the invention wherein side wall 3' of storage bin 1' contains a flat portion 3a' defined by a plane intersecting side wall 3' and extending downwardly to bottom wall 10' at an angle with the vertical axis 2' of the bin slightly larger than the normal angle of side wall 3' with said vertical axis. In this instance, rotatable shaft 9' extends upwardly through bottom wall 10' so that the same is concentrically positioned within bin 1', the axis of shaft 9' coinciding with the axis 2' of bin 1'. While shaft 9' is concentrically positioned within side wall 3', due to the fact that flat portion 3a' contains openings 7' therein at a point closer to axis 2' than the remainder of side wall 3' at the same level, i.e. level a, thrust finger 6a' of ejector bar 6' passes wall 3, at its closets point at openings 7'. A stirrer element 5' is disposed above ejector bar 6' in order to achieve favorable guiding of fertilizer material 4' downwardly toward openings 7'. Once material 4' passes through openings 7', the same falls upon rotatable disc 8' and centrifugally passes outwardly due to the action of scoop members 8a'.

As may be seen more clearly from FIG. 3, flat portion 3a' of side wall 3' at the level of openings 7' and ejector bar 6' above bottom wall 10' represents a chord of a circle defined by the circular side wall 3' at level a, such that the radial distance of a line normal to the chord and extending from the chord to the shaft axis is substantially the same as the length of ejector bar 6' between axis 2' and the radially outermost portion of thrust finger 6a'. Thus, the closest point in the circular path of thrust finger 6a' with respect to the side wall 3', during rotation of ejector bar 6' is adjacent openings 7' with the result that thrust finger 6a' during rotation just clears wall portion 3a' for maximum ejection efficiency of material 4' from bin 1' to rotatable disc 8' situated therebelow. The number of openings in the side wall portion is not critical.

In accordance with a further feature of the invention, FIG. 4 shows an embodiment similar to that of FIG. 1 wherein the rotatable shaft 9" extending upwardly through bottom wall 10" into storage bin 1" is located along an axis 2" which is eccentrically positioned with respect to the central vertical axis of storage bin 1". Accordingly, upon rotation of shaft 9" and in turn ejector bar 6", thrust finger 6a" will extend past opening 7" in side wall portion 3a" more closely than at any other point along its path with respect to side wall 3". In this embodiment, a slidable cover 5" adjusts the cross section of opening 7" whereby the quantity of particle fertilizer material 4" ejected may be controlled. Material 4" falls upon rotatable disc 8" therebelow at the annular zone 8b. As may be seen more clearly from FIG. 5, zone 8b is located in the radial area of curved scoop members 8a", with the result that such material may be caught by the corresponding scoop member in the direction of rotation of disc 8" as indicated by the arrow, and centrifugally thrown outwardly in the desired manner. It should be noted in this embodiment that the scoop members 8a" are curved with their concave side facing the direction of rotation of the disc and with their inner ends spaced from the center of shaft 9" so as to form a trailing angle with the radius of disc 8" passing through the inner end of the scoop member 8a". Moreover, as may be noted from FIG. 4, the cross section of the curved scoop members 8a" is U-shaped in nature with one free end of the U being secured to the disc surface, both free ends being directed toward the direction of rotation of the disc.

A further embodiment is shown in FIG. 6 which combines two storage bin arrangements. The overall storage bin 11 is defined by a pair of inverted frusto-conical members intersecting one another along an axial extent so as to form separate circular downwardly converging side wall portions terminating at separate end wall members. In the manner of the embodiment of FIG. 1, the shafts 14a and 14b extend upwardly through the bottom portions of the respective inverted frusto-conical bin portions along the corresponding axes 14a' and 14b'. The axes 14a' and 14b' are respectively eccentrically positioned with respect to the corresponding vertical axis of the particular inverted frusto-conical portion of bin 11. The shafts 14a and 14b carry ejector bars 13a and 13b, respectively at their ends extending within the bin adjacent openings 15a and 15b in the desired manner. Openings 15a and 15b conveniently face one another. Shafts 14a and 14b carry rotatable discs 16a and 16b respectively whereby the desired rotation is carried out by the shafts at the same rate of rotation due to the transmission arrangement 17 of conventional design illustrated only schematically in the figure. Disc 16a carries the U-shaped scoop members 20a and 21a while disc 16b carries U-shaped scoop members 20b and 21b.

As may be seen more clearly from FIG. 7, scoop member 20a and scoop member 20b in this embodiment are curved scoop members while scoop member 21a and scoop member 21b are straight edge scoop members. Nevertheless, all of the scoop members are positioned with the free or open ends of the U extending toward the direction of rotation of the particular disc. It will be appreciated that discs 16a and 16b rotate at the same rate but in opposite directions as noted by the arrows A and B. A suitable shield 24 is provided along the back portion of the discs 16a and 16b to prevent a spreading of the fertilizer material in an undesired direction, i.e. in a direction toward the vehicle end upon which the spreader apparatus is disposed. The longitudinally curved scoop member in each instance is secured to the disc by means of pins 18 and 19 while the longitudinally straight edge scoop member in each instance is attached by pins 18' and 19'. Pins 18 and 18' are conveniently spaced from the shaft axis a given distance so that the trailing angle of the particular scoop member with the radius passing through the particular pivot end, with respect to the direction of travel of the disc may be adjusted in a one step forward or rearward movement. Hence, by pivoting curved scoop members 20a and 20b and straight scoop members 21a and 21b with respect to the direction of travel of the particular disc, to the corresponding positions shown in dash line, so that the outer pin of the corresponding scoop member will be fixed in bore hole 23a, 23b, 24a or 24b, as the case may be, the angle alpha or alpha″ with the radius 22a or 22b will change to the angle alpha′ or alpha‴, and vice versa.

The relationship between the particular curved scoop member and the radius through the particular pivot point may be more clearly defined as the angle between the chord of the curved scoop member passing through the connecting pins 18 and 19 and the radius passing through the radially inner pin 18. On the other hand, with respect to the straight edge scoop member, the angle may be defined as that between the longitudinal axis of the scoop member passing through the pins 18′ and 19′ and the radius of the disc extending through pin 18′.

It will be appreciated, therefore, that the various embodiments of the invention serve to prevent in a simple manner the caking or fusing of particle fertilizer material in the lower portion of the storage bin due to the ejector bar thrust finger position which assures a steady and constant mixing of the ingredients within the bin and a precise ejection thereof through the opening for spreading in the desired manner by reason of the scoop discs. A certain clearance between the bottom wall of the bin and the rotatable ejector bar is necessary, of course, in order to assure the avoidance of caking or fusing of the hygroscopic fertilizer material.

Accordingly, the fertilizer particles which pass to the lower part of the bin are pressed by the ejector bar to the opening or openings in a pressure-suction manner, a positive pressure being exerted against the particle material as the thrust finger comes closely alongside the wall portion near the opening while a negative pressure is exerted with respect thereto as the thrust finger completes its rotary path through the remainder of the bin. This is true either by reason of the eccentric positioning of the shaft axis with respect to the axis of the bin or because of the chord-positioning of the side wall portion containing the opening closer to the shaft axis than the remainder of the side wall of the bin. During the decreased pressure portion of the cycle, the particles are permitted to flow downwardly from above so as to flow through the opening in loose condition under less heat than is present during the pressure portion of the cycle. Therefore, the material which is not ejected through the opening will remain in the portions of the bin remote from the opening in loose condition and that material which passes below the ejector bar into the bottom portion of the bin will be maintained in loose condition yet favorably contain the inevitable friction heat which is generated between the rotating ejector bar and the fertilizer disposed in its path and not ejected, or that situated along the lower portion of the bin containing the rotatable shaft. Such friction heat, which cannot be favorably dissipated to avoid overheating of the fertilizer material and concomitant caking, is retained within the bin without disadvantage due to the large capacity of the fertilizer within the bottom portion for absorbing such heat. The pressure changes as well as the large capacity of the material below the level of the ejector bar to contain the friction heat together prevent the fusing or caking of the particles since any hygroscopic tendency of the fertilizer under the heat generated by the mechanical action within the bin is offset by the large heat reservoir provided. In any case, the portion of the material adjacent the opening is compressed out the opening in the simplest manner by the thrust finger whereas after the thrust finger has passed the opening the fertilizer returns to its previous loose condition and continued outflow is insured.

Of course, a further aid to the agitation of the particles and a prevention of caking or fusing is in the provision for a stirrer element on the shaft at a point above the opening whereby efficient loose downward flow of the fertilizer from the upper portions of the bin to the working level of the shaft and ejector bar may take place even where moist or cake-prone fertilizer types are being used. Naturally, even though the bottom wall of the bin is closed any and all heat will be suitably retained for preventing any caking.

Once the fertilizer has been ejected through the opening, the same will pass upon the discs which contain adjustably positioned scoop members, especially those which are curved toward the direction of rotation of the disc, whereby all types of fertilizers may be uniformly distributed by centrifugal spreading independent of the specific weight, moisture content, particle size, bin openings, etc.

In view of the particular configuration of the scoop members, the fertilizer particles which fall upon the disc closer to the axis of rotation thereof will be given a greater acceleration than those particles which fall onto the disc closer to the periphery thereof. Consequently, all particles, independent of their location of fall onto the disc will undergo a uniform distribution onto the ground. Suitably, however, the zone of the disc at which the material from the opening is received is positioned with respect to the opening so that the material will fall within a specific range which may be readily accommodated by the disc surface.

The equalization of the spreading distance of the particles and the precise distribution onto the ground in an even manner is enhanced by the fact that a certain preliminary separation of the particles occurs with respect to grain size, specific weight, and moisture content as the particles fall from the opening onto the disc. Specifically, for example, the larger fertilizer grains will fall onto the disc closer to the periphery thereof while the smaller fertilizer particles will fall closer to the axis of the disc. Thereby, the heavier particles are given a lesser acceleration radially outwardly of the disc due to the centrifugal forces than the acceleration given to the smaller particles falling onto the disc closer to the axis thereof. A uniform dispersion density at all points along the area being spread is thus achieved in accordance with the various features of the invention independently of the nature or type of fertilizer used, and the size and adjustment of the bin openings.

Furthermore, by employing both straight and curved scoop members, further adjustment may be made by changing the angle between the scoop member and the radius passing through the inner end thereof, as for example, by a pivotal connection. For powdery or uniformly granular types, the starting angles of the curved and straight edge scoop members may be selected so that the particle fertilizer material falling within the range of action of the curved scoop members will undergo, within the radially outer range thereof, a lesser acceleration, and within the radially inner range thereof a greater acceleration than would otherwise be the case. The results achieved would be precisely the reverse with corresponding adjustments of the straight edge scoop members. Advantageously, therefore, it is possible to distribute uniformly granulated types of fertilizer with a uniform dispersion density on the ground within the effective range of centrifugal spreading. Thus, the farmer may use fertilizer materials of multiple grain size and particle weights effectively due to the counter-balancing acceleration given to the particular particles being spread by the scoop members, as well as particles of uniform grain size and specific weight; in the second instance, merely adjusting the angle of the scoop members with respect to the radius passing through the innermost point thereof. Instead of the trial and error methods used in the past, therefore, the farm hand may adjust the curved scoop members into the forward position when using granular fertilizer types having variable particle sizes and into the rearward position when powdery and fine crystalline fertilizer types are being used which possess the same size particles rather than a mixture of variable particle sizes. The reverse is true with the adjustment of the straight scoop members, wherein the forward position is used for particles of the same general size and the rearward position is used for particles of varying sizes.

Naturally, in order to avoid any overlapping of the dispersed fertilizer particles where a pair of coacting scoop discs are used with appropriate storage bins thereabove, the discs are provided with their scoop members staggered with respect to one another.

It will be appreciated that by reason of the particular arrangement of the ejector bar and thrust finger with respect to the bin opening or openings, a precise metering of fertilizer material onto the scoop discs will be achieved independently of the impacts and bumps acting upon the spreader assembly during its travel over the ground.

Preferably, the U-shaped configuration of the scoop members permits a convenient attachment of the lower free end of the U to the rotating disc by the pins whereas the upper free end of the U retains the material thereunder and prevents a premature upward hurling of the material.

What is claimed is:

1. Centrifugal spreader for particle fertilizer material which comprises an inverted frusto-conical storage bin having a side wall and a bottom wall, said side wall having a flat portion defined by a plane intersecting the side wall and extending downwardly to the bottom wall at an angle with the vertical axis of the bin slightly larger than the normal angle of the side wall with said vertical axis, an opening defined in said flat portion at a level spaced from the bottom wall, a rotatable shaft having an end extending upwardly through the bottom wall into the bin and disposed along the vertical axis of the bin, an ejector bar secured to the end of the shaft for rotation therewith and extending radially outwardly therefrom at said level spaced from the bottom wall, said bar having a free end carrying a thrust finger which extends past said opening during each revolution of the shaft for ejecting fertilizer material from the bin through said opening, the closest point in the peripheral path of said thrust finger to the side wall during rotation of the ejection bar being adjacent the opening, and a rotatable scoop disc having adjustably positioned scoop means thereon, said disc being situated on the other end of said shaft exterior to said bin below said opening for receiving thereon fertilizer material ejected by said thrust finger through said opening and centrifugally spreading said material during rotation of the disc in dependence upon the position adjustment of said scoop means.

2. Centrifugal spreader for particle fertilizer material which comprises a tubular storage bin having a circular side wall inwardly converging to a bottom wall closing off the bottom portion of the bin, an opening defined in a portion of the side wall at a level spaced from the bottom wall, a rotatable shaft having an end extending upwardly through the bottom wall into the bin and concentrically disposed within the bin, an ejector bar secured to the end of the shaft for rotation therewith and extending radially outwardly therefrom at said level spaced from the bottom wall, said bar having a free end carrying a thrust finger which travels along a circular path at said level within said bin and extends past said opening during each revolution of the shaft for ejecting fertilizer material from the bin through said opening, the closest point in the circular path of said thrust finger to the side wall during rotation of the ejection bar being adjacent the opening, the portion of the side wall at the level at which said opening is defined therein being situated in a chord of a circle defined by the circular side wall at said level, the radial distance of a line normal to said chord and extending from said chord to the shaft axis being substantially the same as the length of said ejector bar between said axis and the radially outermost portion of said thrust finger whereby said thrust finger during rotation just clears the wall portion having said opening, and a rotatable scoop disc having adjustably positioned scoop means thereon, said disc being situated on the other end of said shaft exterior to said bin below said opening for receiving thereon fertilizer material ejected by said thrust finger through said opening and centrifugally spreading said material during rotation of the disc in dependence upon the position adjustment of said scoop means.

3. Centrifugal spreader for particle fertilizer material which comprises a tubular storage bin having a tubular side wall and an end wall, an opening defined in a portion of the side wall at a level spaced from the end wall, an ejector bar mounted for rotation within said bin along a path spaced from the end wall and having a free end carrying a thrust finger which extends past said opening during each revolution for ejecting fertilizer from the bin through said opening, the closest point in the peripheral path of said thrust finger to the side wall during rotation of said ejector bar being adjacent the said portion of the side wall having said opening defined therein, and a rotatable scoop disc having scoop means thereon, said scoop means including at least one curved scoop member extending from a point on said disc spaced from the center thereof to the periphery of the disc and positioned at a trailing angle to the radius of the disc passing through said point with respect to the direction of rotation of said disc, said disc being positioned with respect to said opening such that the path of rotation of the annular portion of said disc measured radially between said point and the disc periphery is situated substantially directly below said opening for receiving thereon within said annular portion fertilizer material ejected by said thrust finger through said opening and centrifugally spreading said material during rotation of the disc in dependence upon the radial location within said annular portion where said material is received on said disc.

4. Spreader according to claim 3 wherein said ejector bar carries a centrally disposed stirrer means rotatable therewith for conducting fertilizer material to the level of the bin at which said opening is located.

5. Spreader according to claim 3 wherein said ejector bar is mounted for rotation on a shaft eccentrically positioned with respect to the longitudinal axis of the tubular bin.

6. Spreader according to claim 3 wherein the portion of the side wall in which said opening is defined is closer to the axis of rotation of said ejector bar and the longitudinal axis of the tubular bin than the remaining portion of the side wall.

7. Spreader according to claim 3 wherein the size of said opening is adjustable.

8. Spreader according to claim 3 wherein more than one opening is provided in said side wall.

9. Centrifugal spreader for particle fertilizer material which comprises a tubular storage bin having a tubular side wall and an end wall, an opening defined in a portion of the side wall at a level spaced from the end wall, an ejector bar mounted for rotation within said bin along a path spaced from the end wall and having a free end carrying a thrust finger which extends past said opening during each revolution for ejecting fertilizer from the bin through said opening, the closest point in the peripheral path of said thrust finger to the side wall during rotation of said ejector bar being adjacent the said portion of the side wall having said opening defined therein, and a rotatable scoop disc having scoop means thereon, said disc being provided with a top surface carrying scoop members thereon rotatable therewith including at least one curved scoop member extending from a point on said surface spaced from the center of the disc to the periphery of the disc and having a convex side and a concave side, said curved scoop member being positioned on said disc substantially at a trailing angle to the radius of the disc passing through said point, with respect to the direction of rotation of said disc, and being pivotable on said disc at said point for adjustment of said trailing angle, the concave side of said curved scoop member being directed toward the direction of rotation of said disc, said disc being positioned with respect to said opening such that the path of rotation of the annular portion of said disc measured radially between said point and the disc periphery is situated substantially directly below said opening for receiving thereon within said annular portion fertilizer material ejected by said thrust finger through said opening and centrifugally spreading said material during rotation of the disc in dependence upon the radial location within said annular portion where said material is received on said disc and the position adjustment of said scoop member.

10. Spreader according to claim 9 wherein two curved scoop members are provided diametrically opposed to one another on the disc top surface, each said scoop member extending from a corresponding point on said surface spaced from the center of the disc to the periphery of the disc and positioned on said disc substantially at a trailing angle to the radius of the disc passing through the corresponding point, with respect to the direction of rotation of the disc.

11. Centrifugal spreader for particle fertilizer material which comprises a tubular storage bin having a tubular side wall and an end wall, an opening defined in a portion of the side wall at a level spaced from the end wall, an ejector bar mounted for rotation within said bin along a path spaced from the end wall and having a free end carrying a thrust finger which extends past said opening during each revolution for ejecting fertilizer from the bin through said opening, the closest point in the peripheral path of said thrust finger to the side wall during rotation of said ejector bar being adjacent the said portion of the side wall having said opening defined therein, and a rotatable scoop disc having scoop means thereon, said disc being provided with a top surface carrying scoop members thereon rotatable therewith including two curved scoop members diametrically opposed to one another on the disc top surface, each said scoop member extending from a corresponding point on said surface spaced from the center of the disc to the periphery of the disc and positioned on said disc substantially at a trailing angle to the radius of the disc passing through the corresponding point, with respect to the direction of rotation of the disc, the trailing angle of each said curved scoop member being defined by a chord joining the ends of the corresponding scoop member and passing through the corresponding point and the disc radius passing through said point, and each said scoop member being pivotable on said disc at said corresponding point for adjustment of the corresponding trailing angle, said disc being positioned with respect to said opening such that the path of rotation of the annular portion of said disc measured radially between said point and the disc periphery is situated substantially directly below said opening for receiving thereon within said annular portion fertilizer material ejected by said thrust finger through said opening and centrifugally spreading said material during rotation of the disc in dependence upon the radial location within said annular portion where said material is received on said disc and the position adjustment of said curved scoop members.

12. Centrifugal spreader for particle fertilizer material which comprises a tubular storage bin including a vertically positioned tubular side wall and an imperforate bottom end wall sealing off the bottom portion of said side wall, the bottom end wall and the bottom portion of said side wall being impervious to moisture and to flow of particle fertilizer material, an opening defined in a portion of the side wall at a level upwardly spaced from the bottom end wall, an ejector bar mounted for rotation within said bin along a path upwardly spaced from the bottom end wall and having a free end carrying a thrust finger which extends past said opening during each revolution for ejecting fertilizer from the bin through said opening, the closest point in the peripheral path of said thrust finger to the side wall during rotation of said ejector bar being adjacent the side portion of the side wall having said opening defined therein, and a rotatable scoop disc having scoop means thereon, said disc being situated below said opening for receiving thereon fertilizer material ejected by said thrust finger through said opening and centrifugally spreading said material during rotation of the disc.

13. Centrifugal spreader for particle fertilizer material which comprises an inverted frusto-conical storage bin having a side wall and a bottom wall, an opening defined in the side wall at a level spaced from the bottom wall, a rotatable shaft having an end extending upwardly through the bottom wall into the bin and eccentrically positioned with respect to the central axis of the bin, an ejector bar secured to the end of said shaft for rotation therewith and extending radially outwardly therefrom at said level spaced from the bottom wall, said bar having a free end carrying a thrust finger which extends past said opening during each revolution of the shaft for ejecting fertilizer material from the bin through said opening, the closest point in the peripheral path of said thrust finger to the side wall during rotation of the ejector bar being adjacent the opening, and a rotatable scoop disc having adjustably positioned scoop means thereon, said scoop means including a curved scoop member and a straight scoop member diametrically opposed to one another on the disc and extending from corresponding points on said disc spaced from the center thereof to the periphery of the disc, respectively, each scoop member being positioned at a trailing angle to the radius of the disc passing through the corresponding point, with respect to the direction of rotation of the disc, said disc being situated on the other end of said shaft exterior to said bin below said opening for receiving thereon fertilizer material ejected by said thrust finger through said opening and centrifugally spreading said material during rotation of the disc in dependence upon the position adjustment of said scoop means.

14. Centrifugal spreader for particle fertilizer material which comprises a tubular storage bin having a tubular side wall and an end wall, an opening defined in a portion of the side wall at a level spaced from the end wall, an ejector bar mounted for rotation within said bin along a path spaced from the end wall and having a free end carrying a thrust finger which extends past said opening during each revolution for ejecting fertilizer from the bin through said opening, the closest point in the peripheral path of said thrust finger to the side wall during rotation of said ejector bar being adjacent the said portion of the side wall having said opening defined therein, and a rotatable scoop disc having scoop means thereon, said rotatable scoop disc being provided with a top surface carrying two scoop members thereon rotatable therewith and diametrically opposed to one another on the disc top surface including a curved scoop member and a straight scoop member, each scoop member extending from a corresponding point on said surface spaced from the center of the disc to the periphery of the disc, respectively, and positioned on said disc substantially at a trailing angle to the radius of the disc passing through the corresponding point, with respect to the direction of rotation of said disc, said disc being positioned with respect to said opening such that the path of rotation of the annular portion of said disc measured radially between said corresponding points and the disc periphery is situated substantially directly below said opening for receiving thereon within said annular portion fertilizer material ejected by said thrust finger through said opening and centrifugally spreading said material during rotation of the disc in dependence upon the radial location within said annular portion where said material is received on said disc.

15. Centrifugal spreader for particle fertilizer material which comprises a tubular storage bin having a tubular side wall and an end wall, an opening defined in a portion of the side wall at a level spaced from the end wall, an ejector bar mounted for rotation within said bin along a path spaced from the end wall and having a free end carrying a thrust finger which extends past said opening during each revolution for ejecting fertilizer from the bin through said opening, the closest point in the peripheral path of said thrust finger to the side wall during rotation of said ejector bar being adjacent the said portion of the side wall having said opening defined therein, and a rotatable scoop disc having scoop means thereon, said rotatable scoop disc being provided with a top surface carrying two scoop members thereon rotatable therewith and diametrically opposed to one another on the disc top surface including a curved scoop member and a straight scoop member, each scoop member extending from a corresponding point on said surface spaced from the center of the disc to the periphery of the disc, respectively, and positioned on said disc substantially at a trailing angle to the radius of the disc passing through the corresponding point, with respect to the direction of rotation of said disc, said curved scoop member being pivoted on said disc at the corresponding point for adjustment of said trailing angle, said disc being positioned with respect to said opening such that the path of rotation of the annular portion of said disc measured radially between said corresponding points and the disc periphery is situated substantially directly below said opening for receiving thereon within said annular portion fertilizer material ejected by said thrust finger through said opening and centrifugally spreading said material during rotation of the disc in dependence upon the radial location within said annular portion where said material is received on said disc and the position adjustment of said curved scoop member.

16. Spreader according to claim 15 wherein said trailing angle is defined between a chord joining the ends of said curved scoop member and passing through said point and said disc radius passing through said point, and both said scoop members are pivoted on said disc at said points for adjustment of said trailing angles.

17. Spreader according to claim 16 wherein each scoop member has a U-shaped cross-section, one free end of the U being secured to the disc surface, and both free ends being directed toward the direction of rotation of the disc.

18. Spreader according to claim 17 wherein two adjacent tubular storage bins are provided, having their side wall openings directed toward each other and their rotatable discs in the same horizontal plane and coupled for rotation at the same rate in opposite directions, the diametrically opposed scoop members on one disc being staggered with respect to the diametrically opposed scoop members on the other disc.

19. Spreader according to claim 18 wherein a shield is provided adjacent about one-half of the periphery of each disc on the same side of a line connecting the centers of the discs.

References Cited in the file of this patent
UNITED STATES PATENTS

| | | |
|---|---|---|
| 2,766,872 | Pillsbury | Oct. 16, 1956 |
| 3,038,643 | Van Der Lely et al. | June 12, 1962 |

FOREIGN PATENTS

| | | |
|---|---|---|
| 79,864 | Denmark | Sept. 19, 1955 |

OTHER REFERENCES

Germany (German Printed Application), 1,017,836, Oct. 17, 1957.